Figure 1:
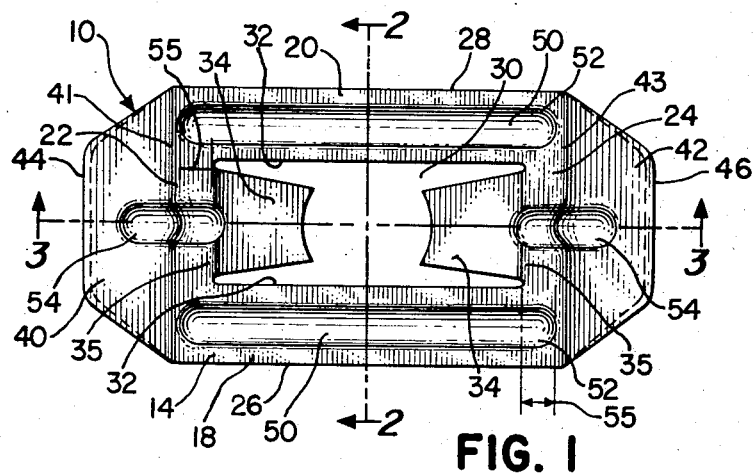

United States Patent
Cook

[15] 3,699,840
[45] Oct. 24, 1972

[54] PUSH-ON BRIDGE WASHER FOR PNEUMATIC TIRE TUBES

[72] Inventor: Michael W. Cook, Mogadore, Ohio
[73] Assignee: The Goodyear Tire & Rubber Company, Akron, Ohio
[22] Filed: May 17, 1971
[21] Appl. No.: 144,136

[52] U.S. Cl. .................................. 85/36, 152/429
[51] Int. Cl. ...... F16b 17/00, F16b 43/00, B60c 23/10
[58] Field of Search ........... 24/73 SC; 152/429; 85/36

[56] References Cited

UNITED STATES PATENTS

| | | | |
|---|---|---|---|
| 2,070,005 | 2/1937 | Dom et al. | 85/36 |
| 2,822,712 | 2/1958 | Garman | 85/36 X |
| 3,464,309 | 9/1969 | Kilmarx | 85/36 |

Primary Examiner—Donald A. Griffin
Attorney—F. W. Brunner and Michael L. Gill

[57] ABSTRACT

A lightweight one-piece bridge washer for use in conjunction with a pneumatic tire tube and wheel rim to grip the valve stem and hold the tube away from the valve stem opening in the rim. The bridge washer includes a flat rectangular base for engaging the tube, spring tongs to grip the valve, and end members supportable by the rim. Necessary strength is provided by ridges formed in the base and end members.

The foregoing abstract is not to be taken as limiting the invention of this application, and in order to understand the full nature and extent of the technical disclosure of this application, reference must be made to the accompanying drawing and the following detailed description.

6 Claims, 4 Drawing Figures

PATENTED OCT 24 1972  3,699,840

PUSH-ON BRIDGE WASHER FOR PNEUMATIC TIRE TUBES

This invention relates to devices for spanning a valve hole in a tire rim to hold the tube away from the valve hole, and more particularly to such a device in the form of a one-piece push-on bridge washer for use with large tires and rims.

It has been common in the past in the case of large truck tires and earthmover tires to provide a rigid bridging means around the valve stem between the rim and the inner tube to prevent the air pressure in the tube from forcing the tube too tightly against the valve hole in the rim. One method of providing such a bridging device is to utilize a flat plate surrounding the valve stem and adjacent the tube. The plate is held in place by a nut received over the valve stem and threadably engaged with the base of the valve stem adjacent the plate. This use of a threaded nut and plate involves two items of hardware and considerable labor in installing the device on the tube. A one-piece push-on type bridge washer has been disclosed in U.S. Pat. No. 3,464,309. This washer is a push-on type having end walls and side walls to rigidify the total structure.

The present invention provides a novel and improved push-on type bridge washer which provides economy in manufacturing and in materials. It is made as a one-piece stamping from a single thin sheet of metal and the amount of material required is reduced to a minimum. The metal is thin enough to provide gripping tongs which can be slid over the valve stem and gripped in position. It is rigid enough, however, to provide the necessary strength to hold the tube away from the rim hole and maintain the position and alignment of the valve stem. All of this is accomplished in a lightweight, easy to manufacture one-piece bridge washer.

It is, therefore, an object of this invention to provide a lightweight, one-piece bridge washer which is economical to make and install.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

Figure 2:
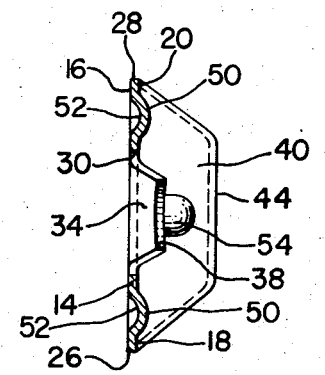
Figure 3:
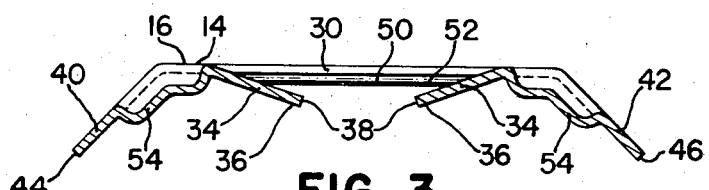
Figure 4:
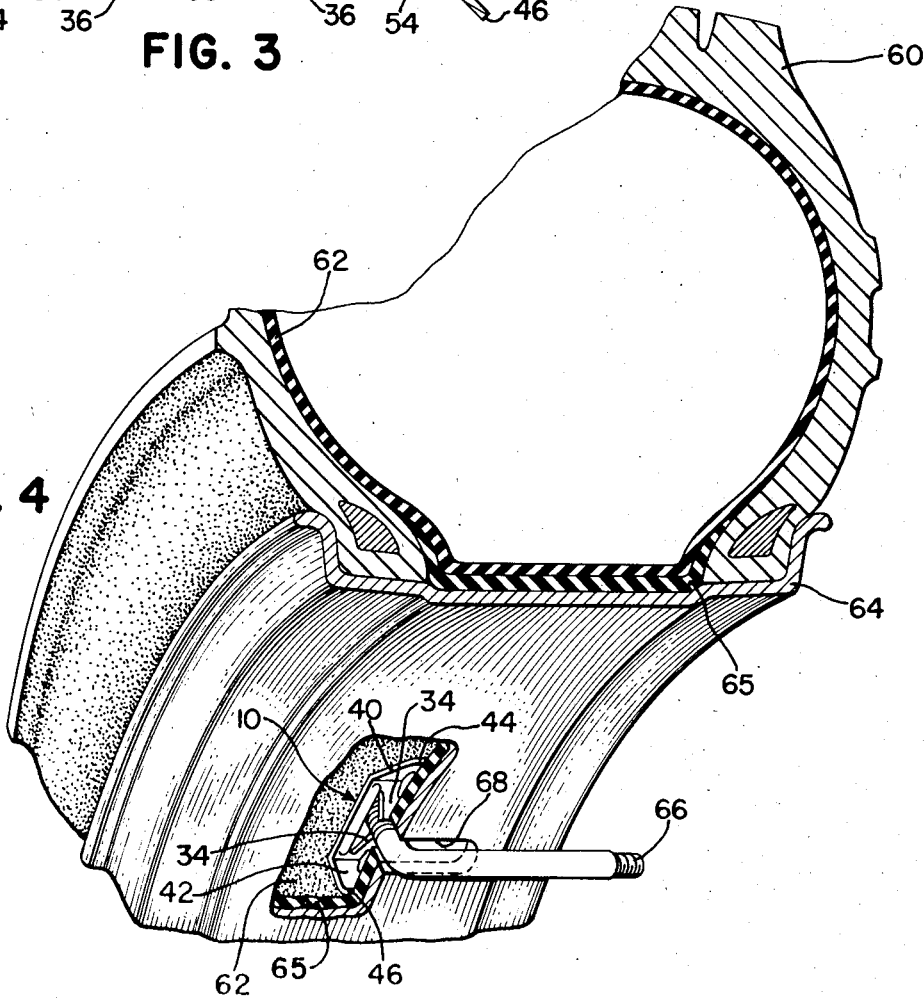

In the drawings:

FIG. 1 is a plan view of a bridge washer made in accordance with this invention, FIG. 2 is a sectional view of a portion of the washer of FIG. 1 taken substantially along line 2—2 of FIG. 1, FIG. 3 is a sectional view of a portion of the washer of FIG. 1 taken substantially along line 3—3 of FIG. 1, and FIG. 4 is a perspective view of a tire, tube and rim assembly utilizing the bridge washer of FIG. 1.

With reference to the drawings, and in particular FIGS. 1 through 3, a bridge washer 10, according to the present invention, is formed entirely from a single thin plate of metal. The bridge washer 10 includes a generally flat rectangular base portion 14 having one surface 16 adapted to engage the surface of an inner tube around a valve stem. The base portion 14 has side portions 18 and 20 and end portions 22 and 24, the side portions 18 and 20 being longer than the end portions 22 and 24. The bridge washer 10 terminates in lateral directions in side edges 26 and 28 lying in the general plane of the base 14 and along the respective edge portions 18 and 20. A generally rectangular hole 30 located generally centrally within the base 14 with its long sides 32 extending parallel to the side edges 26 and 28. A pair of spring tongs 34 extend generally toward each other from the opposite ends 35 or short sides of the hole 30 toward each other. As best seen in FIG. 3, each tong 34 extends angularly away from the plane of the tube engaging side 16 of the base 14. The free ends 36 of the tongs 34 are provided with valve gripping edges 38 which are curved to generally correspond to the radius of the vale stem. The spring tongs 34 are thin enough to be sprung over the valve stem and threads on the valve stem and yet stiff enough to secure the washer in place adjacent the tube once the washer is forced over the stem.

An end member 40, 42 extends angularly from each end portion 22, 24 and away from the tube engaging side 16 of the base 14. Each end member 40 and 42 is as wide as the base 14 at the juncture 41 or 43 between the base 14 and the end member 40 or 42 and becomes increasingly narrow toward the outer extremity 44 or 46. The angle of each end member 40, 42 with respect to the plane of the base 14 is such that the outer extremity 44 or 46 of each end member 40, 42 will engage or be supported by the rim when the bridge washer 10 is positioned in the total assembly of the tube, valve stem and wheel rim.

Strengthening or rigidifying means 50 are provided in each side portion 18 and 20 of the base 14. The rigidifying means 50 includes an embossed or raised rib 52 extending parallel to each side edge 26 and 28 and substantially for the entire length of the base 14. Additional rigidifying means 54 span the juncture between the base 14 and each end member 40 and 42. The rigidifying means 54 includes a raised or embossed rib extending perpendicularly across the juncture 41, 43 between the base member and the end member 40, 42. The raised ribs 50 extend to the junctures 41 and 43 and a raised rib 54 extends across each juncture 41 and 43, thus providing a lapped portion 55 between the two sets of raised ribs 50 and 54 and a sufficiently rigid structure from end to end to hold the tube away from the rim.

With reference to FIG. 4, the bridge washer 10 is illustrated in use on a tire 60, tube 62 and rim 64 assembly. The washer is pushed over the valve stem 66 with the tube engaging side 16 adjacent the tube 62. The tongs 34 are sprung over the valve stem 66 to hold the washer in position relative to the tube. The outer ends 44 and 46 of the end members 40 and 42 bear against the wheel flap 65 and are ultimately supported by the rim 64. The washer is strong enough to hold the tube 62 away from the valve receiving hole 68 in the rim 64.

While certain representative embodiments and details have been shown for the purpose of illustrating the invention, it will be apparent to those skilled in this art that various changes and modifications may be made therein without departing from the spirit or scope of the invention.

What is claimed is:

1. A one-piece, self-holding bridge washer for gripping the valve stem of a tire tube and spanning a valve stem receiving opening in a tire rim to hold the tube away from the opening in the rim comprising:

a. a generally flat rectangular base having a tube-engaging side for bearing against the tube, said base further having a pair of end portions and terminating in lateral directions in side edges lying generally in the plane of said base;

b. there being a hole through the central portion of said base;

c. a pair of spring tongs extending from opposite ends of said hole generally toward each other and angled away from the tube-engaging side of said base, said tongs terminating in gripping edge portions for engaging and gripping the valve stem when the bridge washer is pushed into place on the valve stem;

d. an end member extending from each end portion of said base angularly away from the tube-engaging side of said base, the outer extremity of said end member relative to said base being supportable by the rim;

e. first reinforcing means in said base extending parallel to said side edges to strengthen said base; and f. a second reinforcing means located about midway between the side edges and spanning the juncture between said base and each end member to stabilize said each end member relative to said base.

2. A bridge washer as claimed in claim 1, wherein said first reinforcing means comprises a ridge formed in the base portion and extending from one end member to the other end member.

3. A bridge washer as claimed in claim 2, wherein said first reinforcing means includes one said ridge located on each side of said hole.

4. A bridge washer as claimed in claim 3, wherein said second reinforcing means comprises a ridge formed in and extending between each end member and the base.

5. A bridge washer as claimed in claim 4, wherein a ridge of said second reinforcing means extends from each end member to between the ends of the ridges of said first reinforcing means to form a lapped portion between said first reinforcing means and said second reinforcing means.

6. A bridge washer as claimed in claim 1, wherein said second reinforcing means comprises a ridge formed in and extending between each said end member and the base.

* * * * *